Oct. 25, 1927.  
A. G. McKENNA  
BEARING FOR TURBINE PUMP SHAFTS  
Filed Oct. 5, 1926
1,646,624
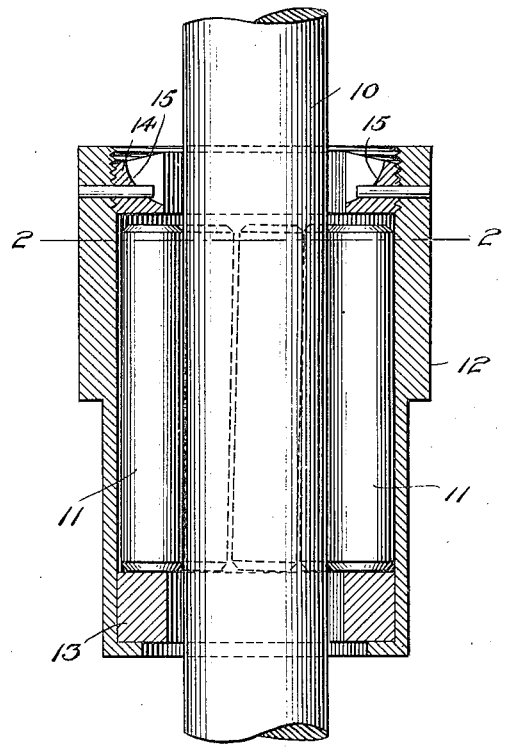
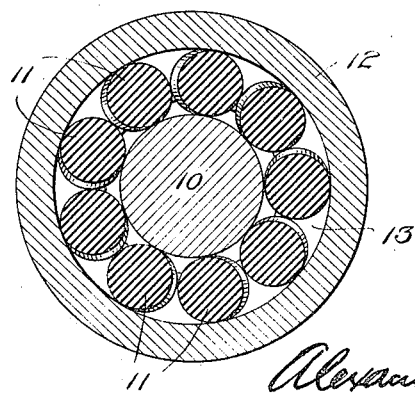
Inventor  
Alexander G. McKenna  
By  
His Attorney Patented Oct. 25, 1927.

1,646,624

UNITED STATES PATENT OFFICE.

ALEXANDER G. McKENNA, OF WASHINGTON, DISTRICT OF COLUMBIA, ASSIGNOR TO POMONA MANUFACTURING COMPANY, OF POMONA, CALIFORNIA, A CORPORATION OF CALIFORNIA.

BEARING FOR TURBINE-PUMP SHAFTS.

Application filed October 5, 1926. Serial No. 139,675.

This invention relates to bearings and particularly to bearings for vertical, rotatable drive shafts of deep well turbine pumps and other similar hydraulic machinery.

Owing to the pressure and action of the water in wells, it is very difficult to effect and maintain the proper oil or grease lubrication of the bearings of such drive shafts and as considerable sand or grit is pumped out of the well, the destructive action of the sandy grit, friction and corrosion quickly destroy the ordinary metallic bearing surfaces and the shaft itself. For instance, when a pump is first installed, the water initially pumped off will contain anywhere from 20 to 40 per cent of sand. In view of this, experimental work has been conducted from which it has been ascertained that rubber, usually vulcanized, and similar resilient materials when submerged in and wetted or lubricated by water form a very durable bearing composition, resisting wear and corrosion very efficiently and being especially resistant to scoring or cutting by the sand or grit carried by the water.

The bearing contemplated by the present invention is, in accordance with the knowledge so gained, made of rubber or similar resilient material and an object of the invention is to provide a bearing of this type wherein it will be practically impossible for sand carried by the water to become packed around or on the bearing surfaces. More specifically, the invention seeks to provide a bearing which will preferably make a line contact with the shaft at a plurality of points spaced circumferentially of the shaft and in addition take advantage of the resiliency and flexibility of the rubber to effect a constant change in points of contact between said shaft and bearing surface. More specifically, the bearing contemplated by the present invention comprises a series of roller bearings essentially of rubber assembled around the shaft in a suitable carrier, the several rollers being loose in the carrier and free to assume positions within the carrier, whereby their individual lines of contact with the shaft will lie at an angle to the center of rotation of said shaft.

In this way there is a constant steady pressure of the individual bearings on the shaft and, as a result, each bearing is rotated about its own axis or center, thereby causing different portions of the bearing to be successively brought into engagement with the shaft. Such an arrangement renders it practically impossible for sand to accumulate and pack in the bearing, thereby greatly increasing the life and efficiency of the bearing.

With these and other objects in view, the invention consists in certain details of construction and combinations and arrangements of parts, all as will hereinafter be more fully described and the novel features thereof particularly pointed out in the appended claims.

In the accompanying drawings,—

Figure 1 is a sectional view taken longitudinally of the pump shaft, illustrating the preferred form of bearing embodying the present invention.

Fig. 2 is a sectional view taken transversely of the shaft.

As has been pointed out, the present bearing is adapted to contact with the shaft 10 of the pump at a plurality of points spaced circumferentially of said shaft. Preferably, each contact between the shaft and bearing is a line contact and for this reason the bearing surface is constituted by a plurality of roller bearings 11 composed essentially of rubber or other resilient material which possesses the ability of resisting wear and corrosion and of also resisting scoring or cutting out by the sand or grit carried by the water which passes through the bearing to act as a lubricant. If desired, the individual rollers may be vulcanized. They are carried in any suitable support such as a sleeve 12 surrounding the shaft, the bore of said sleeve being partially closed at one end by a permanently secured ring 13 and its opposite end by a ring 14 threaded in the bore of the sleeve whereby the assembly of the rollers in the sleeve and their removal therefrom is facilitated. Ring 14 may be formed with recesses 15 so said ring may be screwed in and out of the sleeve with an ordinary spanner wrench.

It will be observed that the rollers 11 are not provided with any retaining or positioning means, such as a cage. On the other hand they are loose in the interior of sleeve 12 and when the shaft is not rotating the several rollers can assume positions wherein their axes are parallel to the axis of the shaft 10. Not only are the rollers 11 loose in their carrier, but there is also a space between the rollers large enough to permit them to twist slightly when shaft 10 revolves so that the axes of the several rollers lie at an angle to the axis of the shaft. This is believed important as the rollers, when in this latter position under operating conditions, produce a continuous pressure against shaft 10 which results in a continuous rotation of the rollers even when a thick mixture is being pumped. Due to this continuous rotation of the rollers 11, the line of contact between each roller and shaft 10 is constantly changing and, consequently, sand passing through sleeve 12 cannot become packed between the shaft and any of the contacting bearing surfaces constituted by the rollers. As a result, cutting out, or scoring, of the parts is prevented. It might be added that a bearing identical with that shown in the present instance as the preferred embodiment of the invention has been tested by being used in pumping a mixture of 40 per cent sand for twenty-four hours, eighteen tons of sand per hour being pumped, without showing any signs of wear and practically no indications of wear on the shaft being apparent.

While the present bearing is especially adapted for use with pump shafts, it will be appreciated that it may be well adapted for use in other situations where water is apt to gain access to the bearing. For instance, the bearing may be used on propeller shafts.

What I claim is:

1. In combination, in a pump, a rotatable shaft, a sleeve surrounding said shaft, and a plurality of bearing elements essentially of rubber loosely retained in spaced relation in said sleeve and engaging said shaft whereby said elements will be free to engage the shaft along lines at an angle to the center of rotation of the shaft.

2. In combination, in a pump, a rotatable shaft, a plurality of elongated rubber bearing elements arranged around the periphery of said shaft, and a carrier enclosing said rubber bearing elements and in which said elements are loosely positioned in spaced relation to one another whereby said elements will be free to engage the shaft along lines at an angle to the center of rotation of the shaft.

3. In combination, in a pump, a rotatable shaft, a sleeve surrounding said shaft, and a plurality of bearing elements essentially of rubber in said sleeve, said bearing elements each making a line contact with said shaft and free to assume a position within said sleeve whereby the individual lines of contact of the several elements will lie at an angle to the center of rotation of the shaft.

4. In combination, in a pump, a rotatable shaft, a sleeve surrounding said shaft, a plurality of spaced bearing surfaces carried by said sleeve and each making a line contact with said shaft, the lines of contact of said surfaces and shaft being capable of assuming positions at an angle to the center of rotation of said shaft.

5. A bearing, comprising a carrier or casing and a plurality of roller bearings essentially of rubber loosely positioned in said casing, said bearings being free to rotate in said carrier and spaced from one another whereby they are free to assume positions with their individual centers of rotation at an angle to the longitudinal center of said casing.

ALEXANDER G. McKENNA.